(12) United States Patent
Svensson et al.

(10) Patent No.: US 6,536,789 B2
(45) Date of Patent: Mar. 25, 2003

(54) VEHICLE SUSPENSION ATTACHMENT ASSEMBLY

(75) Inventors: Stefan Svensson, Torslanda (SE); Joseph Lee Buchwitz, Westland, MI (US); Jeffrey Lipa, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/790,048

(22) Filed: Feb. 21, 2001

(65) Prior Publication Data
US 2002/0113397 A1 Aug. 22, 2002

(51) Int. Cl.[7] ................................................. B60G 3/62
(52) U.S. Cl. .......................... 280/124.151; 280/124.13; 280/124.141; 280/124.142
(58) Field of Search ..................... 280/124.13, 224.141, 280/124.142, 124.144, 124.151, 124.147; 267/220

(56) References Cited

U.S. PATENT DOCUMENTS

| 3,940,161 A | * | 2/1976 | Allison ............. 280/124.147 X |
| 4,105,222 A | * | 8/1978 | Buchwald ......... 280/124.144 X |
| 4,531,761 A | | 7/1985 | von Sivers |
| 4,756,517 A | * | 7/1988 | Kakimoto ......... 280/124.147 X |
| 4,813,704 A | | 3/1989 | Smith |
| 4,973,075 A | * | 11/1990 | Rori et al. ........ 280/124.144 X |
| 4,989,894 A | * | 2/1991 | Winsor et al. ........ 280/124.144 |
| 5,133,573 A | * | 7/1992 | Kijim et al. ...... 280/124.147 X |
| 5,344,187 A | | 9/1994 | Kreis et al. |
| 5,454,585 A | * | 10/1995 | Dronen et al. ......... 280/124.147 |
| 5,467,971 A | * | 11/1995 | Hurtubise et al. .... 280/124.147 |
| 5,538,274 A | * | 7/1996 | Schmitz et al. ... 280/124.144 X |
| 5,997,038 A | | 12/1999 | Dostert et al. |

* cited by examiner

Primary Examiner—Paul N. Dickson
Assistant Examiner—Toan To
(74) Attorney, Agent, or Firm—Gregory P. Brown

(57) ABSTRACT

A vehicle suspension attachment assembly 10 including a spring 17, a pair of spring seats 16, 18 which are coupled to the spring 17, a bushing 25 which is coupled to seat 16, and an attachment member 24 which is received by the seat 16 and the bushing 25 and which is substantially concentric to the seat 16 and to the bushing 25, thereby reducing the overall packaging requirements of a vehicle suspension 12 incorporating the assembly 10.

8 Claims, 1 Drawing Sheet

VEHICLE SUSPENSION ATTACHMENT ASSEMBLY

(1) FIELD OF THE INVENTION

The present invention generally relates to a vehicle suspension attachment assembly and more particularly, to an attachment assembly which reduces the amount of space required by the overall vehicle suspension while concomitantly allowing for the use of a relatively compliant bushing.

(2) BACKGROUND OF THE INVENTION

A vehicle suspension assembly is typically deployed proximate to a wheel and is effective to insulate the chassis (e.g., the body rail) of the vehicle from shocks and other noise and/or vibrations which are transmitted from the wheel and which are normally communicated to the chassis through the subframe. Typically, such a suspension includes one or more springs and various other devices which cooperatively achieve the desired insulation and which typically require a relatively large amount of mounting space. Moreover, one type of suspension utilizes a relatively compliant bushing which further desirably isolates the chassis from these vibrations and shocks.

Oftentime the amount of available suspension mounting space is rather limited, particularly in the rear of the vehicle (e.g., the portion of the vehicle opposite of the driver) due to the use of several halfshafts which are required for "rear wheel drive" and/or "all wheel drive" operation, the use of a relatively large underbody tub or foldable third row seat and/or body cross members, and the lack of overall packaging space due to other design constraints.

It is therefore desirable to reduce the overall mounting space required by a suspension assembly while reducing the amount of the load which is impressed upon the bushing since such a load requires the use of a relatively stiff bushing which reduces the amount of vibrations and noise which may be "absorbed" by the bushing, thereby increasing the amount of the noise and vibration which is communicated to the vehicle passengers.

SUMMARY OF THE INVENTION

It is a first non-limiting advantage of the present invention to provide a vehicle suspension assembly having an attachment assembly which reduces the amount of packaging and/or mounting space required by the vehicle suspension assembly.

It is a second non-limiting advantage of the present invention to provide a vehicle suspension attachment assembly which reduces the amount oft packaging and/or mounting space required by a vehicle suspension assembly and which concomitantly allows for the use of a relatively compliant bushing within the suspension assembly.

It is a third non-limiting advantage of the present invention to provide a vehicle suspension assembly which, in one non-limiting embodiment of the invention, includes a subframe mounting member which is concentrically attached to a spring seat assembly.

According to a first aspect of the present invention, a mounting assembly is provided and comprises a spring; a pair of spring seats; and a mounting member which is received by the spring and which is substantially concentric to at least one of the pair of spring seats.

According to a second aspect of the present invention, a method for attaching a vehicle subframe to a body member is provided. The method comprises the steps of providing a spring; attaching the spring to the subframe; providing an attachment member; providing a seat; placing the attachment member through the seat; and coupling the attachment member to the body member.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
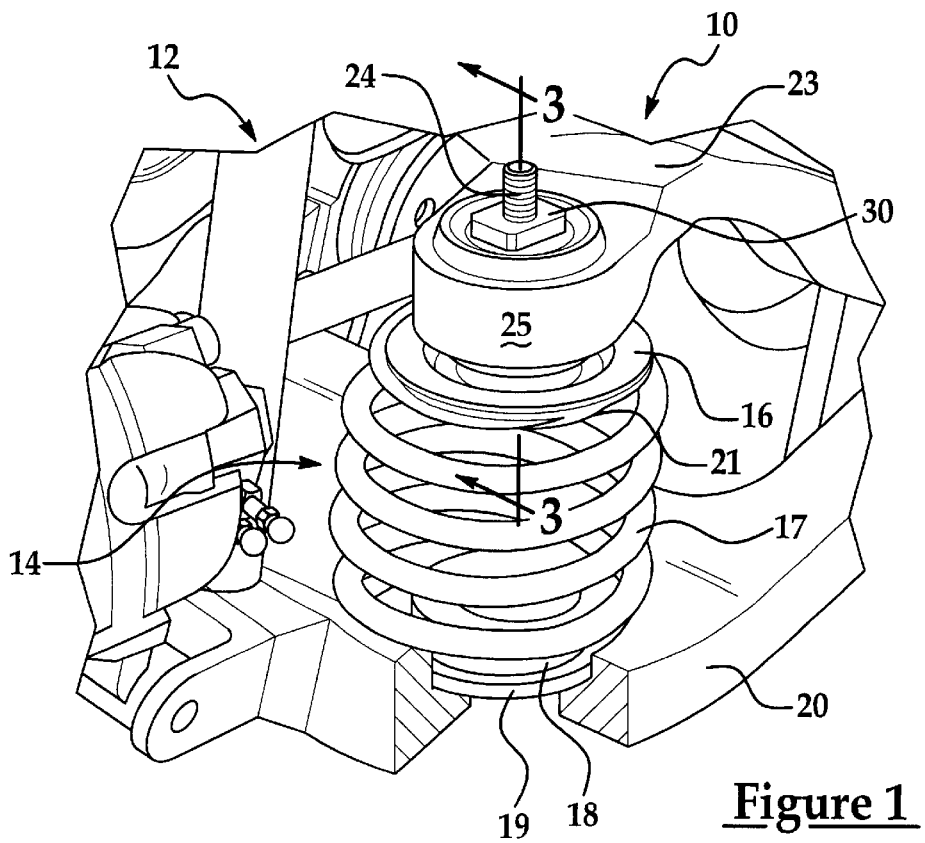
FIG. 1 is a partial perspective cut-away view of a vehicle suspension attachment member which is made in accordance with the teachings of the preferred embodiment of the invention being deployed within a vehicle suspension.
Figure 2:
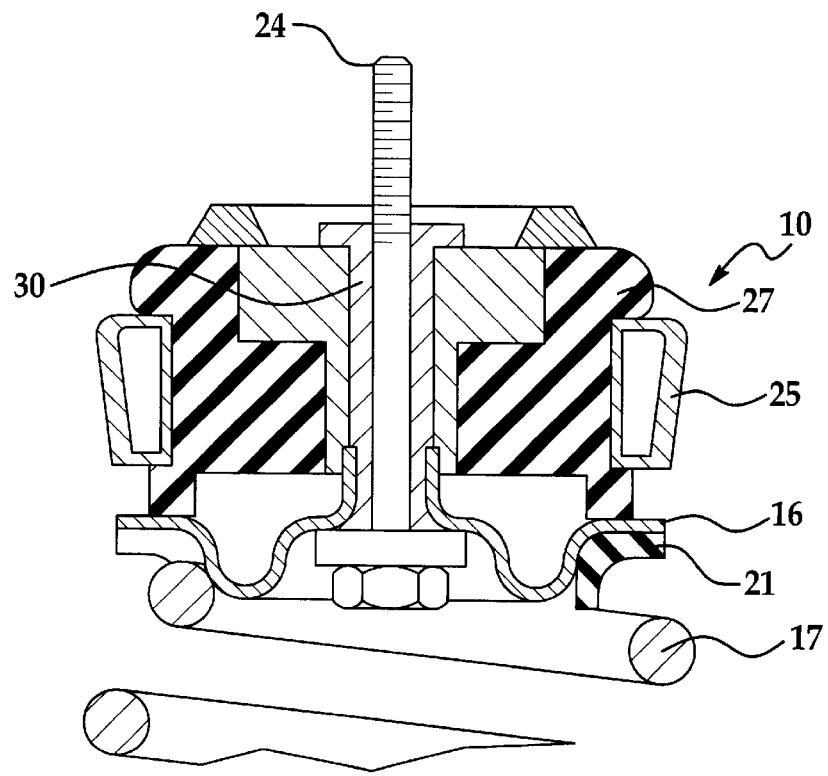
FIG. 2 is a sectional view of the vehicle suspension attachment member which is taken along view line 3—3.

Referring now to FIGS. 1–2, there is shown a vehicle suspension attachment assembly 10 which is made in accordance with the teachings of the preferred embodiment of the invention and which is deployed within and/or which forms part of an overall vehicle suspension assembly 12.

As shown, vehicle suspension mounting assembly 10 includes a spring assembly 14 having an upper seat member 16, a spring 17, a lower seat member 18, a lower a rubber isolator member 19, and an upper rubber isolator member 21. Particularly, as shown, rubber isolator member 19 is physically coupled to a control arm 20 and to the lower spring seat member 18 and member 18 and isolator member 19 cooperatively attach the spring 17 to the control arm 20. Control arm 20 is coupled to and/or is integrally formed with the vehicle subframe 23.

Spring 17 is received at a first end within the lower seat spring seat member 18 and at a second opposed end within the upper seat spring member 16 and the seat members 16, 18 cooperate to operatively position spring 17 upon the control arm 20 in the manner shown in FIGS. 1 and 2.

Mounting assembly 10 further includes an attachment member 24, such as a bolt, and a substantially compliant bushing 25 having a rubber interior portion 27. Bushing 25 is attached to member 16. As shown, in the preferred embodiment of the invention, the attachment member 24 is received within the metallic inner race or sleeve portion 30 of bushing 25 and traverses the bushing 25 and the upper seat member 16. Further, the attachment member 24 rests upon the spring 17 and is further secured in its operative position, shown best in FIG. 3, by the upper seat member 16.

In the preferred embodiment of the invention, the attachment member 24 is substantially concentric to the upper seat member 16, to the spring 17, and to bushing member 25 while physically coupling the upper seat member 16 and the bushing 25 to the body of the vehicle (not shown) and is therefore "concentrically attached to" or "concentrically received by" the spring 17 and the spring assembly 14. This concentric relationship between the spring assembly 17 and the member 24 therefore reduces the amount of packaging space required by the vehicle suspension assembly 12 since there is no required space or distance between the spring assembly 17 and the attachment member 24 (e.g., there is no required distance between the bushing 25 and the member 24).

In one non-limiting embodiment of the invention, the inner race or sleeve 30 of the bushing 25 is attached to (e.g., by use of a welded connection) or is integral to the upper spring seat member 16, thereby allowing substantially all of the vertical load from the spring 17 to be reacted through the inner metal portion 30 of the bushing 25 and communicated to the subframe 23 or to the vehicle body without substantially pre-loading the bushing 25, thereby allowing the bushing 25 to be a substantially compliant bushing and to be effective to absorb a relatively large amount of vibration or noise, thereby reducing the amount of such noise and vibration which is communicated to the passengers of the vehicle.

It is to be understood that the invention is not limited to the exact construction and embodiment which has been previously delineated, but that various changes and modifications may be made without departing from the spirit and the scope of the inventions as are set forth in the following claims. It should be further appreciated that the vehicle suspension attachment assembly may be directly mounted to the subframe 23 or placed in substantially any other convenient location within the vehicle. It should further be appreciated that, in other non-limiting embodiments, member 24 may be only concentric with the bushing 25 (e.g., the spring 17 may be "offset") or may only traverse bushing 25 while only being substantially concentric with bushing 25.

What is claimed is:

1. A vehicle suspension attachment assembly comprising:
   a suspension member having a bottom end, an opposed top end, and a first aperture;
   a lower seat member which is attached to said bottom end of said suspension member and which couples said suspension member to a vehicular control arm;
   a compliant bushing having an outer race, an inner race, and a second aperture, wherein said outer race is coupled to a vehicular subframe and wherein said second aperture is aligned with said first aperture;
   an upper seat member having a third aperture, wherein said upper seat member is disposed upon and is coupled to said top end of said suspension member, and wherein said third aperture is aligned with and cooperates with said second aperture to form a bolt reception cavity which is disposed above said suspension member and which extends only from said upper seat member to said compliant bushing; and
   a single bolt which is selectively disposed within said bolt reception cavity, which is detached from said vehicular control arm, wherein said suspension member is coupled to said subframe by only said single bolt.

2. The vehicle suspension attachment assembly of claim 1 further comprising a rubber isolator which is coupled to the lower seat member.

3. A vehicle suspension attachment assembly comprising:
   a spring having a first aperture;
   a lower spring seat member which is attached to a first end of said spring;
   a bushing having an outer race and an inner race, wherein said outer race is coupled to a vehicular subframe;
   an upper spring seat member having a seat portion and a race portion which forms said inner race of said bushing, wherein said seat portion is disposed upon and is attached to a second end of said spring, and wherein said race portion includes a second aperture which extends through said seat portion and which is disposed above said spring and which extends only from said seat portion to said bushing; and
   a single attachment member which is detached from a vehicular control arm and is selectively disposed within said second aperture, wherein said single attachment member is effective to couple said spring to said vehicular subframe.

4. The vehicle suspension attachment assembly of claim 3 wherein said single attachment member is substantially concentric to said bushing.

5. The vehicle suspension attachment assembly of claim 4 herein said single attachment member is a bolt.

6. The vehicle suspension attachment assembly of claim 4 wherein said bushing is substantially compliant.

7. A method for reducing an amount of packaging space required by a suspension assembly having a control arm and a subframe, said method comprising the steps of:
   providing a suspension member having a bottom end, an opposed top end, and a first aperture;
   coupling said bottom end of said suspension member to said control arm;
   providing a compliant busing having and outer race, an inner race, and second aperture;
   coupling said compliant bushing to said subframe in a manner which substantially aligns said second aperture with said first aperture of said suspension member;
   providing an upper seat member having a third aperture;
   coupling said upper seat member to said top end of said suspension member;
   aligning said third aperture with said first and second apertures, wherein said aligned second and third apertures cooperatively form a bolt reception cavity which is disposed above said suspension member and which extends only from said upper seat member to said compliant bushing; and
   coupling said suspension member to said subframe using only a single bolt by inserting said single bolt into said bolt reception cavity.

8. The method of claim 7 further comprising the step of causing said single bolt to be concentric with said suspension member.

* * * * *